United States Patent
Saniee et al.

(10) Patent No.: US 9,100,347 B2
(45) Date of Patent: *Aug. 4, 2015

(54) METHOD OF BURST SCHEDULING IN A COMMUNICATION NETWORK

(75) Inventors: Iraj Saniee, New Providence, NJ (US); Indra Widjaja, Florham Park, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/630,015

(22) Filed: Dec. 3, 2009

(65) Prior Publication Data

US 2010/0129080 A1    May 27, 2010

Related U.S. Application Data

(63) Continuation of application No. 10/788,824, filed on Feb. 27, 2004, now Pat. No. 7,653,042.

(51) Int. Cl.
| | |
|---|---|
| H04J 3/16 | (2006.01) |
| H04J 14/08 | (2006.01) |
| H04L 12/875 | (2013.01) |
| H04L 12/54 | (2013.01) |
| H04Q 11/00 | (2006.01) |
| H04W 72/02 | (2009.01) |
| H04L 5/22 | (2006.01) |
| H04W 28/04 | (2009.01) |
| H04W 72/04 | (2009.01) |
| H04W 72/12 | (2009.01) |
| H04W 84/12 | (2009.01) |

(52) U.S. Cl.
CPC ............ *H04L 47/56* (2013.01); *H04L 12/5693* (2013.01); *H04Q 11/0066* (2013.01); *H04W 72/02* (2013.01); *H04J 3/16* (2013.01); *H04J 14/086* (2013.01); *H04L 5/22* (2013.01); *H04Q 2011/0064* (2013.01); *H04Q 2011/0088* (2013.01); *H04W 28/04* (2013.01); *H04W 72/0446* (2013.01); *H04W 72/1284* (2013.01); *H04W 84/12* (2013.01)

(58) Field of Classification Search
USPC ....................................................... 370/395.4
See application file for complete search history.

(56) References Cited

U.S. PATENT DOCUMENTS

| | | | | |
|---|---|---|---|---|
| 4,504,946 | A | * | 3/1985 | Raychaudhuri ............... 370/322 |
| 5,570,355 | A | | 10/1996 | Dail et al. |
| 5,742,592 | A | * | 4/1998 | Scholefield et al. .......... 370/329 |
| 5,802,061 | A | * | 9/1998 | Agarwal ....................... 370/461 |
| 6,301,262 | B1 | | 10/2001 | Peterson |
| 6,404,755 | B1 | * | 6/2002 | Schafer ........................ 370/338 |
| 6,556,564 | B2 | * | 4/2003 | Rogers .......................... 370/352 |
| 6,574,211 | B2 | | 6/2003 | Padovani et al. |
| 6,671,511 | B1 | | 12/2003 | Forssell et al. |
| 7,009,991 | B2 | * | 3/2006 | Shachar et al. ............... 370/436 |
| 7,283,552 | B2 | | 10/2007 | Kumaran et al. |
| 7,283,753 | B2 | | 10/2007 | Giles et al. |
| 7,421,257 | B1 | * | 9/2008 | Elliott ........................ 455/127.5 |
| 7,653,042 | B2 | * | 1/2010 | Saniee et al. .................. 370/348 |
| 2002/0167960 | A1 | * | 11/2002 | Garcia-Luna-Aceves .... 370/442 |

(Continued)

*Primary Examiner* — Timothy J Weidner
(74) *Attorney, Agent, or Firm* — Andrew R. Ralston; David M. LaBruno

(57) ABSTRACT

Delay-sensitive burst scheduling in a network is carried out through communications between source and destination nodes. A distributed scheduler at each destination node selects timeslots for burst arrivals from requesting source nodes, irrespective of timeslot selections made by distributed schedulers at other nodes.

20 Claims, 3 Drawing Sheets

(56) References Cited

U.S. PATENT DOCUMENTS

2003/0193908 A1 10/2003 Cain
2005/0094642 A1* 5/2005 Rogers ............... 370/395.4
2006/0077912 A1 4/2006 Cheng

* cited by examiner

METHOD OF BURST SCHEDULING IN A COMMUNICATION NETWORK

RELATED APPLICATIONS

This application is a continuing application of application Ser. No. 10/788,824, filed Feb. 27, 2004.

FIELD OF THE INVENTION

This invention relates to the scheduling of burst transmissions in communication networks. This application is a continuing application of application Ser. No. 10/788,824, filed Feb. 27, 2004.

ART BACKGROUND

The routing of transmissions through optical networks of the prior art is in many cases performed actively, using thermo-optical or optomechanical switches, or using devices that require conversion from the optical to the electrical domain and back. Such active devices tend to add significant expense to the network infrastructure, and generally dissipate significant amounts of power. This application is a continuing application of application Ser. No. 10/788,824, filed Feb. 27, 2004.

One alternative approach to network architecture that avoids the above disadvantages is Time-Domain Wavelength-Interleaved Network (TWIN). TWIN is transparent, in the sense that each transmitted signal remains in the optical domain, at the same wavelength, all the way from the source node to the destination node. A unique wavelength (or set of wavelengths) is assigned to each destination node. Each source node is served by a multiwavelength source. Outgoing transmissions are packaged in the form of optical bursts, each in a specified wavelength channel. In traversing the network, each signal passes through one or more wavelength-selective cross-connects, which ultimately steer each burst to its intended destination. Thus, the wavelength channel assigned to an outgoing burst is, in effect, an intrinsic destination label for that burst.

In the absence of coordination among the source nodes, it is possible for bursts to collide at the destination. That is, bursts from two disparate sources might wholly or partially coincide when received at the destination node. The resulting interference will often be irresolvable. It is also possible in some cases for a single source to be scheduled to send out bursts to two disparate destinations in the same timeslot. Although an occurrence of this kind is also in some sense a "collision," we have here chosen to refer to it as a "source conflict." One solution to the problem of collisions, as well as of source conflicts, has been described in U.S. patent application Ser. No. 10/426,389 which was filed by K. Kumaran et al. on Apr. 30, 2003 and is commonly assigned herewith. The solution described there involves a centralized scheduler which coordinates the source nodes, while also taking into account the respective transmission delays between each source-destination pair.

Although coordinated scheduling provides a useful solution to the problem of collisions, there are also potential advantages to alternative solutions, particularly when traffic is asynchronous, i.e., characterized by dynamically varying bandwidth demands.

SUMMARY OF THE INVENTION

We have discovered that a TWIN network subject to distributed scheduling can support useful levels of throughput, even without coordination among the source nodes. Accordingly, our invention involves a method for scheduling a burst transmission in a network for delivery to a destination. The network may be an optical network. However, the invention also has applications to other communication media. For example, the invention also may be applied in the context of wireless local area networks and other types of radiofrequency communication network. This application is a continuing application of application Ser. No. 10/788,824, filed Feb. 27, 2004.

According to our method, in one aspect, at a receiving node of a communication network, a request is received to schedule at least one timeslot of a recurrent cycle for receipt of burst transmissions from a sending node of the network. In response to the scheduling request, at least one timeslot of the cycle is selected in a manner which is independent of timeslot selections made by other nodes of the network for receipt of burst transmissions. The selected timeslot or timeslots are communicated to the sending node.

In specific embodiments of the invention, each destination node makes timeslot assignments in such a way that no two sources are scheduled for burst arrivals at the destination within the same timeslot. Thus, collisions between arriving bursts at the destination are avoided.

Specific embodiments of the invention include an adaptive feature that tends to reduce the number of source conflicts at the source node. According to such feature, if the destination node senses a missed transmission in an assigned timeslot, it will substitute a different timeslot and notify the source node accordingly.

DETAILED DESCRIPTION

Below, we will describe an illustrative embodiment of the invention for use in a TWIN network. It should be noted that procedures and protocols to be described below also have application in communication media of other kinds, including in radiofrequency communication networks. The principles to be set out below are readily transferred to other such contexts. Accordingly, it should be understood that the context of an optical network in which the invention is to be described is merely illustrative, and not limiting as to the scope of the invention.

Figure 1:
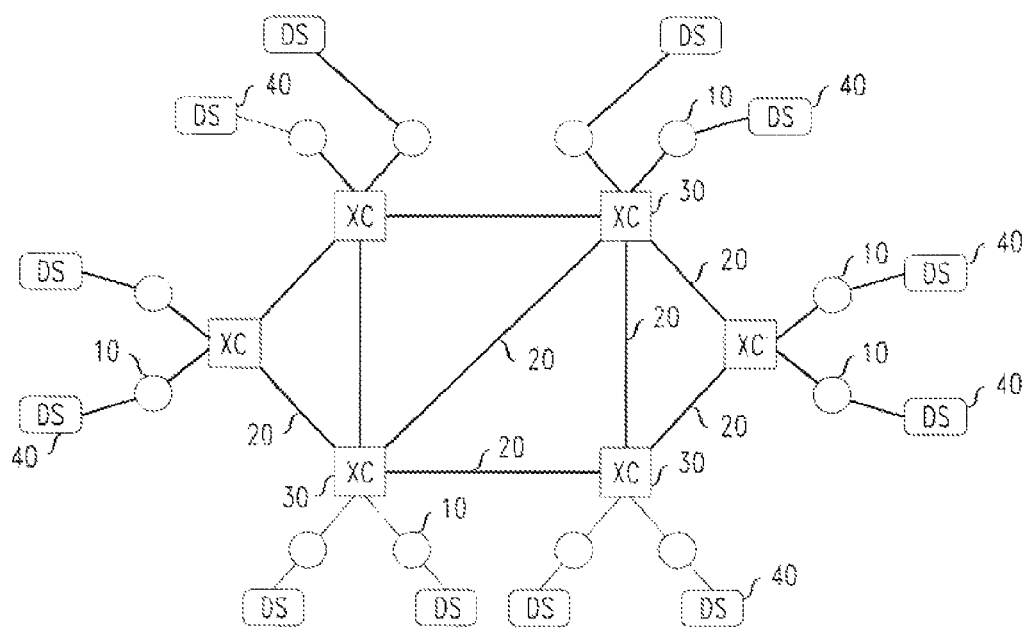
FIG. 1 is a simplified, schematic diagram of an illustrative TWIN network with distributed scheduling.

In the illustrative TWIN network of FIG. 1, nodes 10 are interconnected by optical fibers or other waveguiding media 20, and wavelength-selective cross connects (WSXCs) 30. Each node able to function as a destination for optical bursts is equipped with a distributed scheduler 40. The WSXCs 30 and their interconnecting links constitute the core of the network, and the nodes 10 constitute its edge. In typical applications, each node 10 will serve as an aggregation device which provides service interfaces to clients communication devices situated outside of the TWIN network. The client devices are potentially of various kinds, including IP routers, ATM switches, and SONET ADMs. At the node, incoming client protocol units are aggregated, encapsulated into optical bursts, and launched into the TWIN network via a fast-tunable laser. Also at the node, outgoing bursts are decapsulated into client protocol units and delivered to the appropriate clients. More details concerning TWIN network architecture can be found in U.S. patent application Ser. No. 10/426,388, filed on Apr. 30, 2003 by R. C. Giles et al. and commonly assigned herewith.

Figure 2:
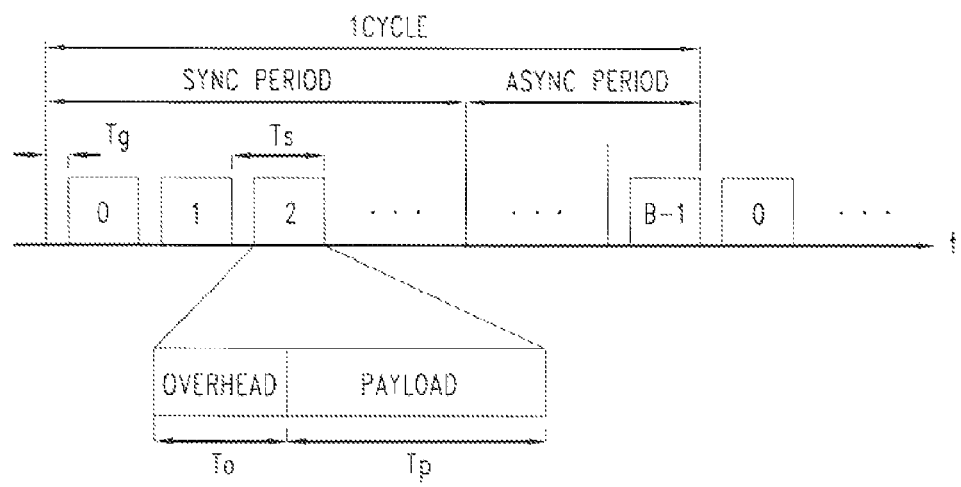
FIG. 2 is a schematic diagram of a burst cycle useful in the practice of the invention.

Optical bursts from the source nodes are scheduled to be transmitted within assigned timeslots, as will be explained below. Timeslots occur in recurring cycles, as illustrated in FIG. 2. Turning to the figure, it will be seen that one cycle is divided into B timeslots, numbered 0, 1, ..., B-1. Each timeslot is of duration $T_s$, including an overhead portion of duration $T_0$, a payload portion of duration $T_p$, and a guard band, separating it from adjacent timeslot, of duration $T_g$.

Importantly, both synchronous and asynchronous traffic can be scheduled and transported on the TWIN network. For synchronous traffic, a constant service rate will typically be provided during the lifetime of a connection. For asynchronous traffic, such as IP traffic, the service rate can be changed dynamically, during the lifetime of a connection, in response to requests issued by the source node. The service rate is measured by the number of timeslots provided per cycle.

Optionally, the cycle can be subdivided into a "synch period" for transmission of synchronous traffic, and an "asynch period" for transmission of asynchronous traffic, as shown in FIG. 2. The boundary between the synch period and the asynch period will typically be adjustable according to the current traffic characteristics.

Figure 3:
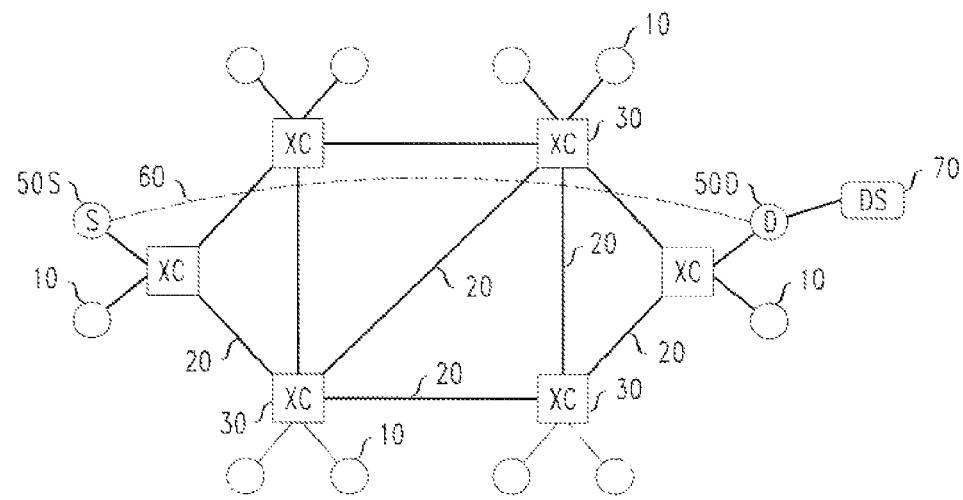
FIG. 3 is a modified view of the network of FIG. 1, illustrating a transaction between two nodes of the network.

In FIG. 3, a particular pair of nodes 50S and 50D have been designated, for purposes of illustration, as a respective source and destination node. To initiate a transmission, source node 50S will send a timeslot request to destination node 50D. The source node will request one or more recurring timeslots, which are to be provided in each cycle until a new request is sent. Optionally, the source node may add timeslot requests and other control information to the overhead portions of already-scheduled, outgoing optical bursts, if such bursts are available and intended for the appropriate destination node. More typically, a separate Data Communication Network (DCN) which overlies the TWIN network will be used to communicate control information between source and destination nodes. A portion of the DCN is represented in FIG. 3 by the broken line 60.

Destination node 50D will respond to a timeslot request from node 50S with a timeslot assignment message. The timeslot assignment will typically be communicated over the DCN, but as noted, may optionally be added to the overhead portion of an appropriate burst. Typically, the information sent back to the source node will identify timeslots for arrival of the bursts at the destination node. Therefore, it will be necessary for the source node to account for transmission delay in the network, and to transmit the burst at a time earlier, by an appropriate amount, than the assigned timeslot. More specifically, a burst assigned the timeslot $t_a$ will depart node 50S at time $t_a - \delta + kB$, wherein $\delta$ signifies the transmission delay, and $kB$ signifies the smallest feasible number of whole cycle times. Synchronization of all of the nodes to a common clock can be achieved using a GPS timing reference. Once this is done, the delays $\delta$ are readily measurable.

As noted above, each source node is equipped with a distributed scheduler. In FIG. 3, for example, node 50S is shown in communication with distributed scheduler 70. The distributed schedulers do not communicate with each other. Typically, each distributed scheduler receives traffic information only in the timeslot requests issued to it by its requesting source nodes. One function of the distributed scheduler is to schedule timeslots. In particular embodiments of the invention, the distributed scheduler performs the scheduling in such a way that collisions at the destination are avoided, and provides substitute timeslots when conflicts occur at a source node. Communication of schedules between the source and destination nodes takes place via the "request" messages from the source, and "grant" messages from the destination.

In principle, the distributed scheduler can be operated in a mode that makes random selections of timeslots for assignment, irrespective of whether any have already been assigned. However, except when the traffic loads are very light, the high blocking probability that results from such a scheme makes it unattractive. Therefore, in the protocol to be described below, the distributed scheduler avoids assigning timeslots that will collide at the destination.

Figure 4:
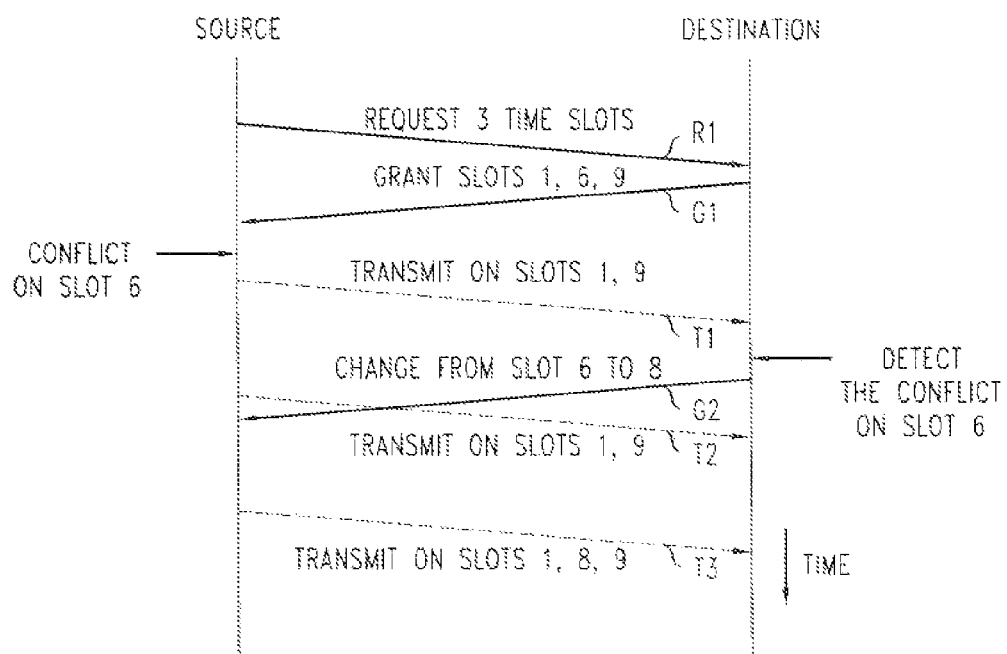
FIG. 4 is a diagram of an exemplary transaction between a source node and a destination node according to a protocol for distributed scheduling.

With reference to FIG. 4, we will now describe a protocol for distributed scheduling. The source node together with its distributed scheduler will be referred to below as "Source," and the destination node as "Destination." In message R1, Source requests to schedule one or more burst transmissions per cycle. In the specific example illustrated, Source is requesting a rate of three bursts per cycle. Upon receiving request R1, Destination grants the requested number of timeslots, for use in cycles subsequent to the current cycle. Thus, for example, grant G1 as illustrated in the figure offers the source timeslots 1, 6, and 9. Upon receiving the grant, Source checks the availability of its tunable laser for transmissions in all of the assigned timeslots. Source computes the required departure time of each burst for the granted timeslots and conflicts between required departure times for multiple times slots. In the example illustrated, Source discovers that there is a conflict with another transmission already scheduled for timeslot 6. Consequently, Source transmits only in timeslots 1 and 9, as indicated by edge T1 in the figure.

Destination learns about conflicts by detecting the absence of received bursts on assigned timeslots. Accordingly, in the present example, Destination fails to receive a burst in timeslot 6 on transmission T1. As a result of non-receipt of the scheduled burst, the Destination thereby detects that timeslot 6 is subject to a conflict. Upon detection of a conflict, Destination returns the unused timeslot to the pool of available timeslots, and assigns a new timeslot to Source for receipt of the non-received burst. In the present example, timeslot 8 is assigned in substitution for timeslot 6. This substitution is communicated to Source in grant G2. In the exemplary scenario shown in the figure, grant G2 arrives at Source during the next cycle following the cycle in which G2 was sent out. In the meantime, Source has sent out a second transmission on timeslots 1 and 9 only, as indicated by edge T2 in the figure. In the next cycle, Source sends bursts in timeslots 1, 8, and 9, as indicated by edge T3 in the figure. Given a sufficiently long cycle time B, the source nodes will as a consequence or the adaptive process described above, generally converge toward a state in which all are transmitting at or near the requested rates to all of their destinations.

When Destination receives a request, it checks the state of all the timeslots in its scheduling cycle. Timeslots that are unassigned and available for use belong to the AVAILABLE state, as indicated by reference numeral S1 in FIG. 5. In response to a request for a number d of timeslots, Destination selects a number {circumflex over (d)} from the AVAILABLE timeslots. Usually, it will be possible to fully satisfy the request, in which case d and {circumflex over (d)} will be equal. In some cases, {circumflex over (d)} may be less than d, due, for example, to an insufficient number of AVAILABLE timeslots, or to a policy which restricts the maximum available rate. The state of the selected timeslots is changed from AVAILABLE to ASSIGNED, as indicated by edge E1 in FIG. 5. The ASSIGNED state, indicated by reference numeral S2 in the figure, is given to those timeslots that have been assigned to a source but have not yet been used. The distinction between used and unused timeslots is important because, as noted above and as will be seen below, failure to use an assigned timeslot in the next cycle after it has been assigned is indicative of a conflict at the source.

Destination then responds to the request with a grant message identifying the {circumflex over (d)} timeslots in which burst arrivals from Source are expected. Upon receipt of the grant message, Source computes the required departure time of each burst. If there is no source conflict, Source transmits {circumflex over (d)} bursts in every cycle, beginning with the cycle after receipt of the grant message, until a need arises for Source to change its transmission rate. In that event, Source sends a new request message.

When Destination receives the first burst in an assigned timeslot, it changes its state from ASSIGNED to USED, as indicated by edge E2 in the figure. The USED state is indicated in the figure by reference numeral S3.

As indicated in the Figure by edge E3, if Source makes a request to decrease the rate or stop transmission, Destination will return some or all of the USED timeslots to the AVAILABLE state.

A timeslot is in the state CONFLICT, indicated by reference numeral S4 in the figure, if it is unavailable due to a source conflict. As noted, Destination will infer such a conflict when an assigned timeslot remains unused in a following cycle, allowing time for a round-trip propagation delay. In that event, Destination will change the state of the timeslot to CONFLICT, as indicated by edge E4 of the figure.

It should be noted that if there is no conflict, but Source has no data to send in the timeslot, Source should send dummy bursts at the designated times to prevent Destination from making false detections of source conflicts.

According to one possible method of conflict resolution, Destination selects an AVAILABLE timeslot and assigns in place of the conflicted timeslot, meanwhile changing the state of the newly assigned timeslot to ASSIGNED. The state of the conflicted timeslot is concomitantly changed to AVAILABLE. These two state changes are represented, respectively, by edges E5 and E6 of FIG. 5. The selection of the substitute timeslot may, for example, be made randomly from those timeslots which are AVAILABLE. The timeslot substitution is communicated by Destination to Source in a "modify" message, upon receipt of which Source begins to use the new timeslot if it is not subject to a conflict.

According to a more general approach to conflict resolution, the timeslot substitution described above is the first of two alternative actions that Destination may take, with respective probabilities p and 1-p. The second alternative is to randomly select a USED timeslot, thus bumping the current user of that timeslot. We refer to such an action as "destination bumping."

Figure 5:
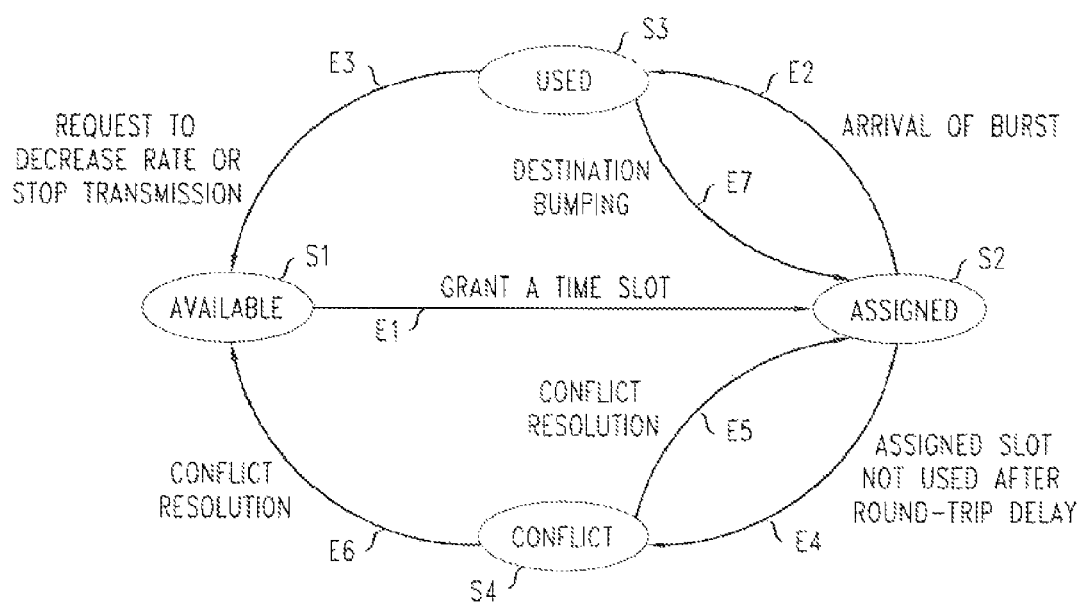
FIG. 5 is a state diagram, illustrating the various possible states of a timeslot according to a protocol for distributed scheduling, and of the possible transitions between the states.

If, for example, the selected timeslot is designated $t_u$, Destination will change the state of $t_u$ to ASSIGNED, and will send a modify message to the bumped source, i.e., the source which had been using $t_u$, instructing it to begin using a new timeslot $t_c$. If there is no conflict, the bumped source will then begin using timeslot $t_c$. The state change of timeslot $t_u$ is indicated in FIG. 5 by edge E7. Destination will of course also send a modify message to Source, instructing it to begin using timeslot $t_u$.

Destination bumping tends to prolong the convergence time of the protocol. However, numerical simulations suggest that by introducing a small amount of destination bumping, e.g. by reducing p from 1.00 to about 0.98, it will in at least some cases be possible to significantly reduce the minimum required cycle length while taking only a modest penalty in convergence time.

Up to this point, our discussion has assumed that when there is a source conflict, the only response available to Source is simply to refrain from transmitting any burst that conflicts with one already scheduled. We will now describe an optional further protocol which permits Source to schedule a new departure time for the conflicting burst. To obtain the new departure time, Source takes it away from an already-scheduled burst. For this reason, we refer to this further protocol as "departure-time reassignment." We refer to the seizing of a departure time from an already-scheduled burst as "source bumping."

We suppose, first, that destination j has sent Source a grant message containing an assigned timeslot. We suppose moreover that the burst-departure time to destination j conflicts with the burst-departure time to a different destination j'. In accordance with our protocol for departure-time reassignment, Source has two alternative courses of action, with respective probabilities q and 1-q. The first course of action is to stop transmitting bursts to destinations j' and to begin transmitting bursts to destination j. The second alternative is simply to refrain from transmitting bursts to destination j.

In the case of either alternative, the respective destination will detect a source conflict and will reassign the scheduled arrival time, as explained above.

To make the departure-time-reassignment protocol more robust, Source may optionally transmit a control burst to destination j' before stopping its burst transmission. Such a control burst will explicitly indicate that source bumping has occurred, and that destination j' must therefore schedule a new timeslot.

Source bumping affects the convergence time of the protocol for distributed scheduling. When q is near zero (nearly no source bumping), Source must rely entirely on each destination's conflict-detection and rescheduling operations to resolve conflicts. When q is near unity (source bumping almost always occurs when there is a conflict), many destinations may simultaneously be forced to reschedule displaced bursts, resulting in still more bumping, which in the worst case may lead to divergence. Numerical simulations have suggested that a moderate amount of departure-time reassignment, e.g. q of about 0.3, can somewhat improve convergence times. Numerical simulations have also suggested that at least for synchronous traffic, the shortest cycle length sufficient to schedule all demands can be reduced somewhat by departure-time reassignment.

Up to this point, our discussion has assumed that all traffic is in the same service class, and that all bursts have the same priority. In fact, however, our protocol can be modified to, e.g., prohibit bumping of specified classes of service, or to impose a hierarchy, i.e., to permit one service to bump another only if the bumped service has lower or equal priority.

According to one approach which allows for priority service, the destination-bumping procedure described above is modified such that when Destination, with probability 1-p, makes a random selection of a USED timeslot, the random selection is limited to USED timeslots carrying services with priority lower than or equal to the priority of the bumping service. The source-bumping procedure described above is also modified—in this case by introducing a new probability q', such that Source, with probability q', stops transmitting bursts to destination j' and starts transmitting bursts to destination j. The new probability q' is the same as the old probability q if and only if the service destined for j' has priority lower than or equal to the priority of the service destined for j. Otherwise, q'=0.

All of the functions described above related to the scheduling of bursts at source and destination nodes are readily carried out by special or general purpose digital information processing devices acting under appropriate instructions embodied, e.g., in software, firmware, or hardware programming.

Other contexts to which the principles described above may be applied include, e.g., wireless local area networks (WLANs). In a WLAN, each burst is inherently labeled by a radiofrequency channel, such that different frequencies are received by different destination nodes. Control communications may be sent, e.g., on one or more dedicated control channels. Formats for radiofrequency bursts are well known and need not be described in detail here.

EXAMPLE

Figure 6:
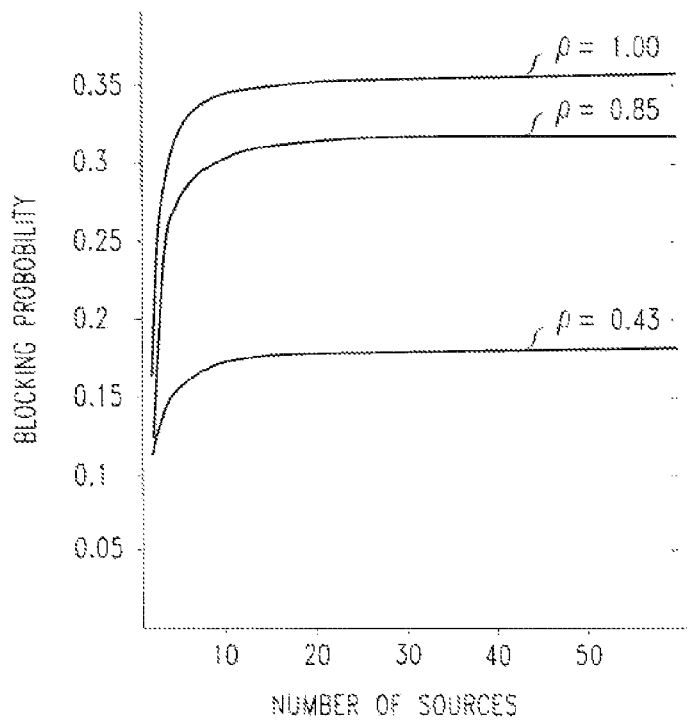
FIG. 6 is a graph, based on numerical simulations, which illustrates the blocking performance of a network implementing certain principles of the present invention in an exemplary embodiment.

We performed numerical simulations of the blocking behavior of a network with distributed scheduling as described above, in which non-colliding timeslots are randomly assigned. We assumed that each of N source nodes requests d timeslots, so the total number of requested timeslots is Nd. We considered the effect of a parameter .rho., referred to as the "utilization." The utilization is defined as the ratio of the total number of requested timeslots, to the cycle length B (as also measured in timeslots). FIG. 6 is a graph of the blocking probability as a function of the number of source nodes, when the destination nodes do not adapt to source conflicts. Curves are provided at utilization levels of 0.43, 0.85, and 1.00. Substantial improvements in performance are expected when there is adaptation to source conflicts, e.g. through one of the mechanisms for conflict resolution described above.

What is claimed is:

1. A method, comprising:
   (a) at a first receiving node of a communication network having a plurality of receiving nodes, receiving a first request to schedule at least one timeslot of a recurrent cycle for receipt of burst transmissions from a sending node of the network, the first receiving node having a schedule for timeslots of the recurrent cycle based on at least one previously received scheduling request;
   (b) in response to the first request, selecting at least one timeslot of the recurrent cycle in a manner which is independent of timeslot selections by the remaining receiving nodes of the plurality of receiving nodes of the network, the at least one timeslot for receipt of burst transmissions; and
   (c) communicating the selected timeslot or timeslots to the sending node.

2. The method of claim 1, further comprising:
   at the sending node, determining at least one time within the recurrent cycle at which bursts need to depart in order to arrive at the receiving node within the selected timeslot or timeslots; and
   in at least one instance of the recurrent cycle, transmitting a burst at least at one of the times that have been determined.

3. The method of claim 1, further comprising:
   detecting non-receipt of a scheduled burst at the receiving node;
   selecting a timeslot in substitution for the timeslot of the non-received burst; and
   communicating the selected substitute timeslot to the sending node.

4. The method of claim 3, wherein the selection of a substitute timeslot comprises choosing between two alternatives, which are: selecting a timeslot that is still unscheduled, and selecting a timeslot that has already been scheduled.

5. The method of claim 1, wherein:
   the first and a second receiving nodes each select at least one timeslot in which bursts are to be received; and the method further comprises, at the sending node:
   determining a departure time within the recurrent cycle for bursts which are to be received at the first receiving node in the timeslot which it has selected;
   assigning said departure time to at least one burst destined for the first receiving node;
   determining a departure time within the recurrent cycle for bursts which are to be received at the second receiving node in the timeslot which it has selected;
   detecting at least one instance of conflict in which the departure time of bursts destined for the first receiving node overlaps the departure time of bursts destined for the second receiving node; and
   reassigning the assigned departure time to at least one burst destined for the second receiving node, such that said departure time is no longer available to bursts destined for the first receiving node.

6. The method of claim 5, wherein the reassigning step is conditional on the outcome of a step of deciding whether or not to reassign.

7. The method of claim 1, wherein the communication network is a Time-Domain Wavelength Interleaved Network (TWIN).

8. A method, comprising:
   at a first receiving node of a communication network having a plurality of receiving nodes, receiving a first request to schedule a timeslot of a recurrent cycle for receipt of burst transmissions from a first sending node of the network;
   selecting a first timeslot of the recurrent cycle in response to the first request to schedule and without consideration of timeslot selections by the remaining receiving nodes of the plurality of receiving nodes of the network for receipt of burst transmissions, the first receiving node maintaining a schedule for timeslots of the recurrent cycle based on at least one received request; and
   communicating the first timeslot to the sending node.

9. The method of claim 8, further comprising:
   at the first sending node, determining a time at which a burst needs to be transmitted in order to be received at the first receiving node within the first timeslot of the recurrent cycle; and
   transmitting, for at least one instance of the recurrent cycle, a burst at the time that has been determined.

10. The method of claim 8, further comprising:
    detecting at the first receiving node non-receipt of a burst transmission in the first timeslot;
    selecting a substitute timeslot for the first timeslot; and
    communicating the substitute timeslot to the first sending node.

11. The method of claim 10, wherein the substitute timeslot is a timeslot of the recurrent cycle in which a burst transmission is not yet due to be received or a timeslot of the recurrent cycle in which a burst transmission already due to be received.

12. The method of claim 8 wherein the schedule for timeslots of the recurrent cycle is based on requests to schedule a timeslot received from sending nodes and based on failures to receive from the sending nodes burst transmissions in scheduled timeslots.

13. The method of claim 8 wherein the schedule for timeslots of the recurrent cycle is modified based on an absence of reception of a burst transmission on the first timeslot.

14. The method of claim 8, wherein the communication network includes the first receiving node and a second receiving node, the first receiving node to receive a burst in the first timeslot and the second receiving node to receive a burst in a second timeslot, the method further comprising, at the sending node:
   determining a first departure time within the recurrent cycle for a burst which is to be received at the first receiving node in the first timeslot;
   determining a second departure time within the recurrent cycle for a burst which is to be received at the second receiving node in the second timeslot;
   detecting at least one instance of conflict in which the first departure time overlaps the second departure time; and
   reconciling the conflict in favor of the first receiving node or the second receiving node.

15. The method of claim 14, further comprising:
   transmitting, for at least one instance of the recurrent cycle, a burst to the first receiving node at the first departure time.

16. The method of claim 14, further comprising:
   transmitting, for at least one instance of the recurrent cycle, a burst to the second receiving node at the second departure time.

17. A method comprising:
   at a first receiving node of a communication network having a plurality of receiving nodes, receiving a request for a timeslot of a recurrent cycle in which the first receiving node will be able to receive burst transmissions from a sending node of the network;
   in response to the reception of the request, scheduling at the first receiving node a first timeslot of the recurrent cycle for reception of burst transmissions from the sending node, the scheduling being performed without regard to timeslot scheduling decisions of the remaining receiving nodes of the plurality of receiving nodes; and
   communicating the first timeslot to the sending node.

18. The method of claim 17, further comprising:
   detecting at the first receiving node non-receipt of a burst transmission in the first timeslot;
   rescheduling the reception of burst transmissions from the sending node from the first timeslot to a substitute timeslot; and
   communicating the substitute timeslot to the sending node.

19. The method of claim 18, wherein the substitute timeslot is a timeslot of the recurrent cycle in which the reception of burst transmissions is not presently scheduled or a timeslot of the recurrent cycle in which the reception of burst transmissions is presently scheduled.

20. The method of claim 17 further comprising, at the sending node:
   determining a first departure time within the recurrent cycle for a burst transmission which is scheduled for reception at the first receiving node in the first timeslot;
   determining a second departure time within the recurrent cycle for a burst transmission which is scheduled for reception at a second receiving node in a second timeslot;
   detecting at least one instance of conflict in which the first departure time overlaps the second departure time;
   reconciling the conflict in favor of the first receiving node or the second receiving node; and
   transmitting, for at least one instance of the recurrent cycle, a burst transmission to one of the first receiving node or second receiving node at the first departure time or the second departure time respectively.

* * * * *